Figure 4:
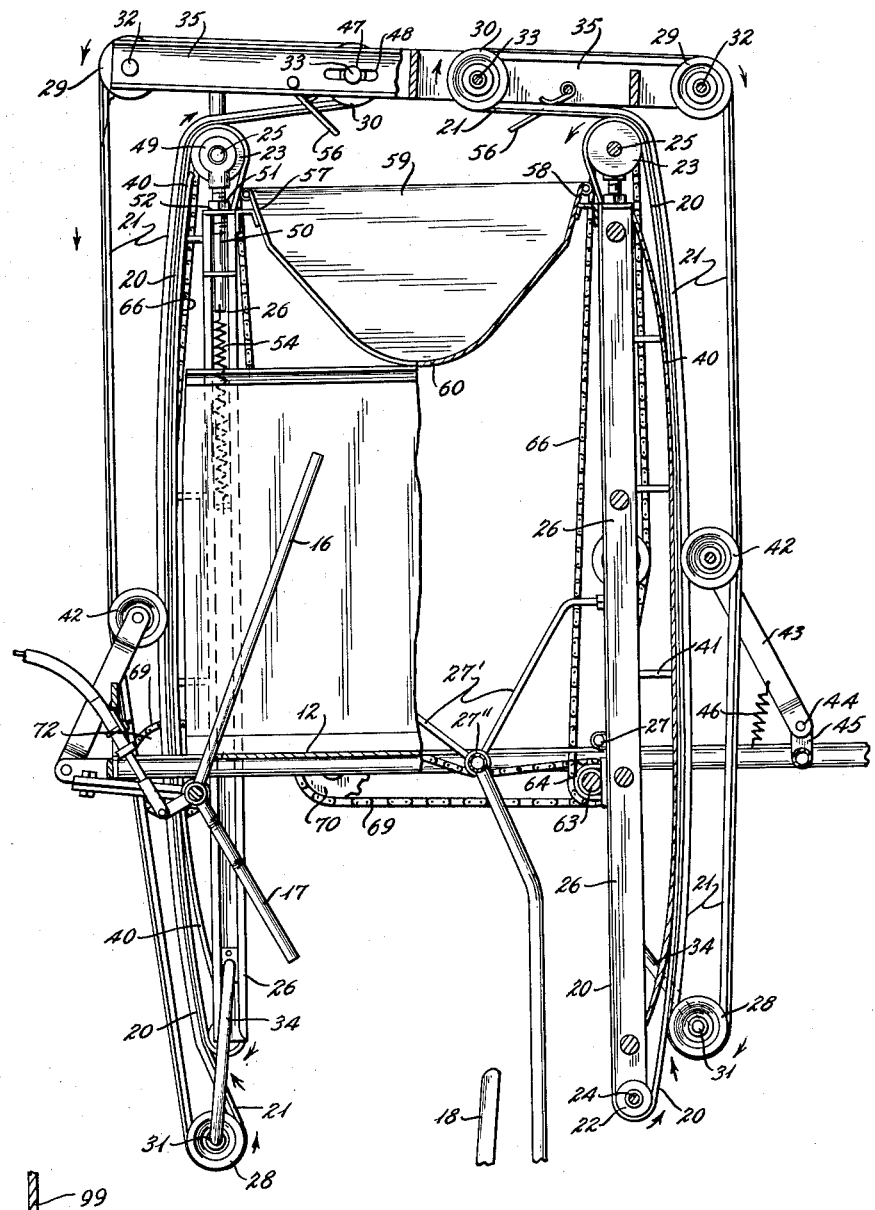

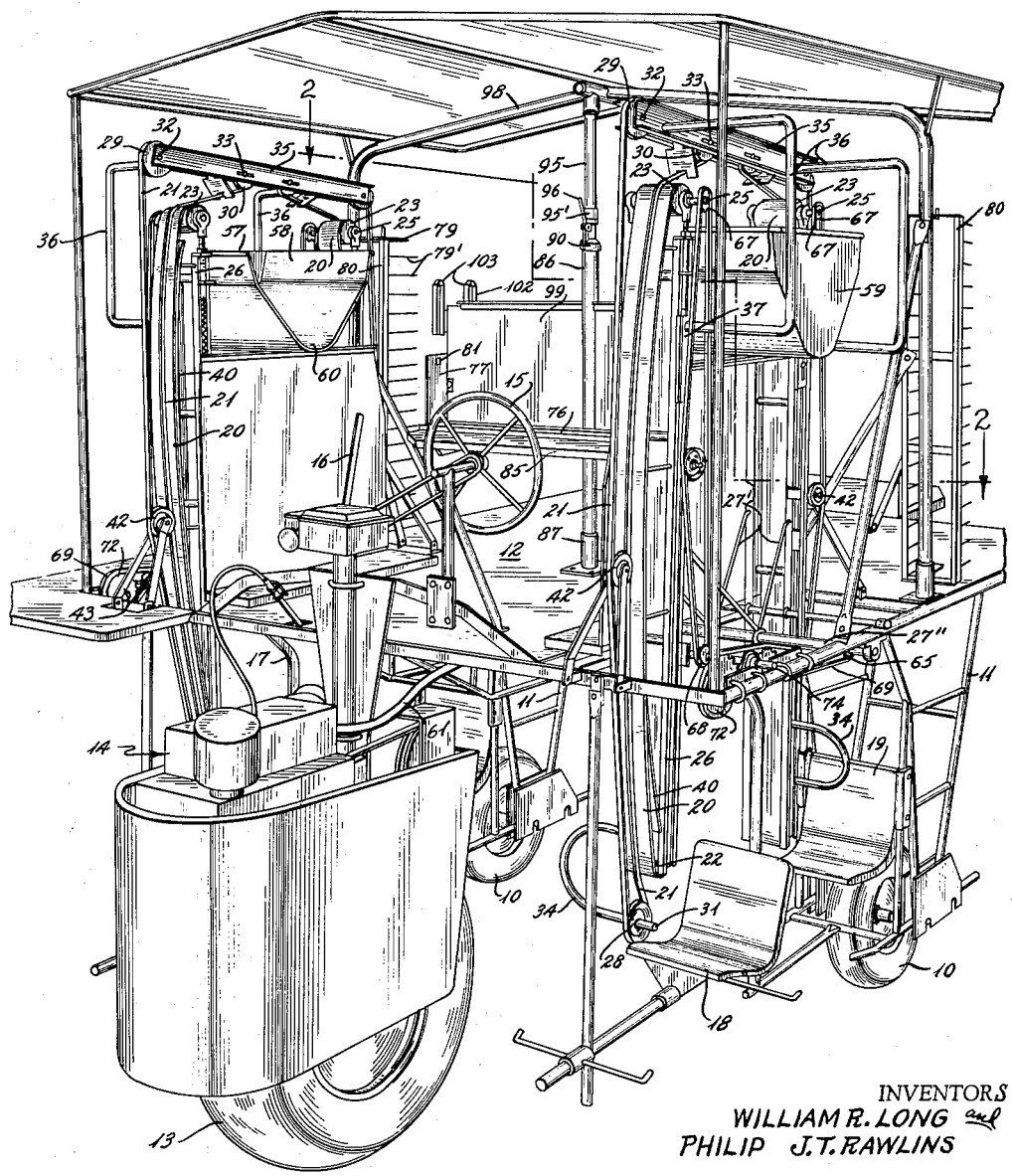

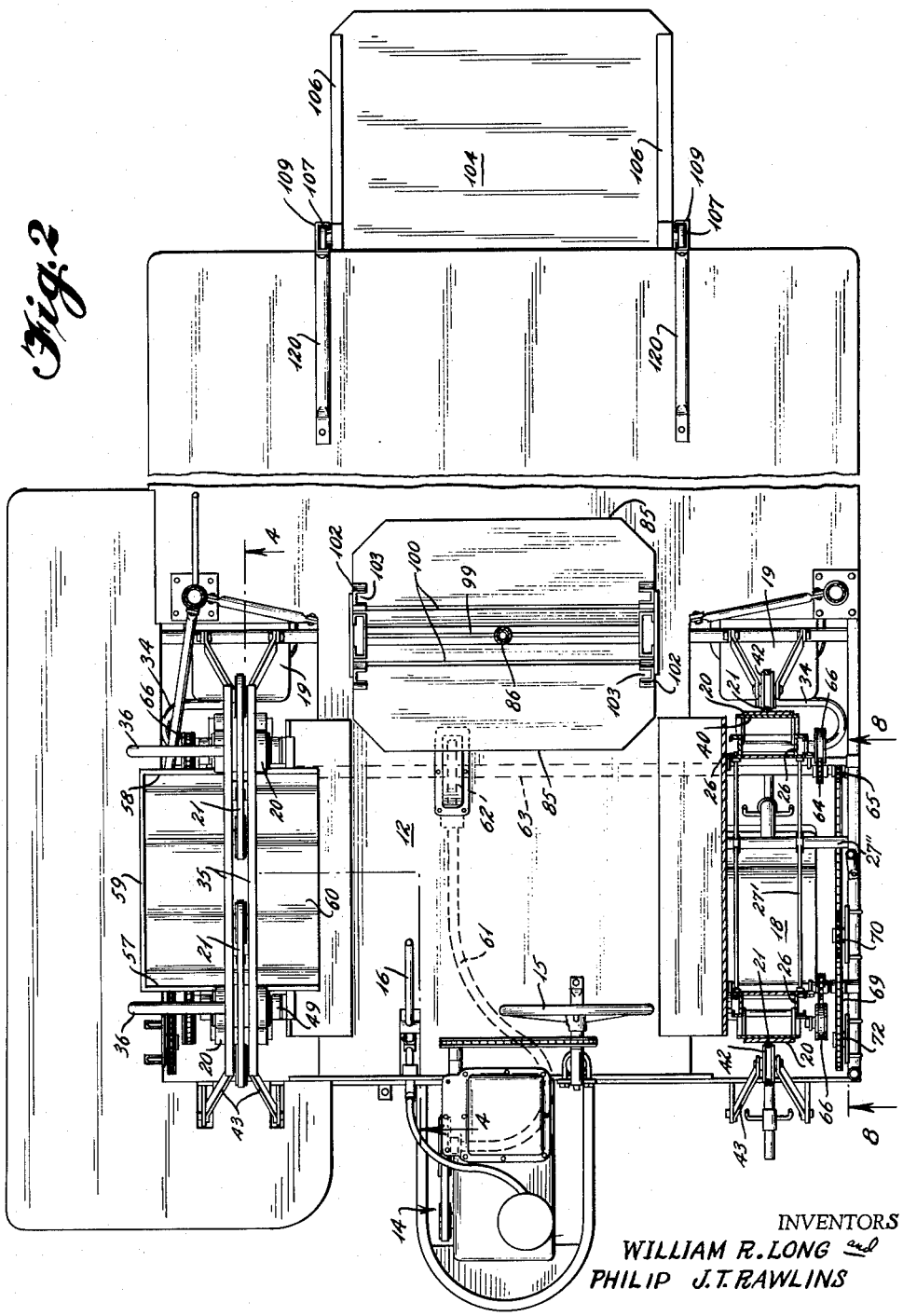

Nov. 2, 1965     W. R. LONG ETAL     3,215,288
TOBACCO HARVESTER WITH COACTING CONVEYORS AND TOBACCO
RECEIVING MEANS HAVING AN OPEN SIDE
Filed Nov. 6, 1961     6 Sheets-Sheet 3
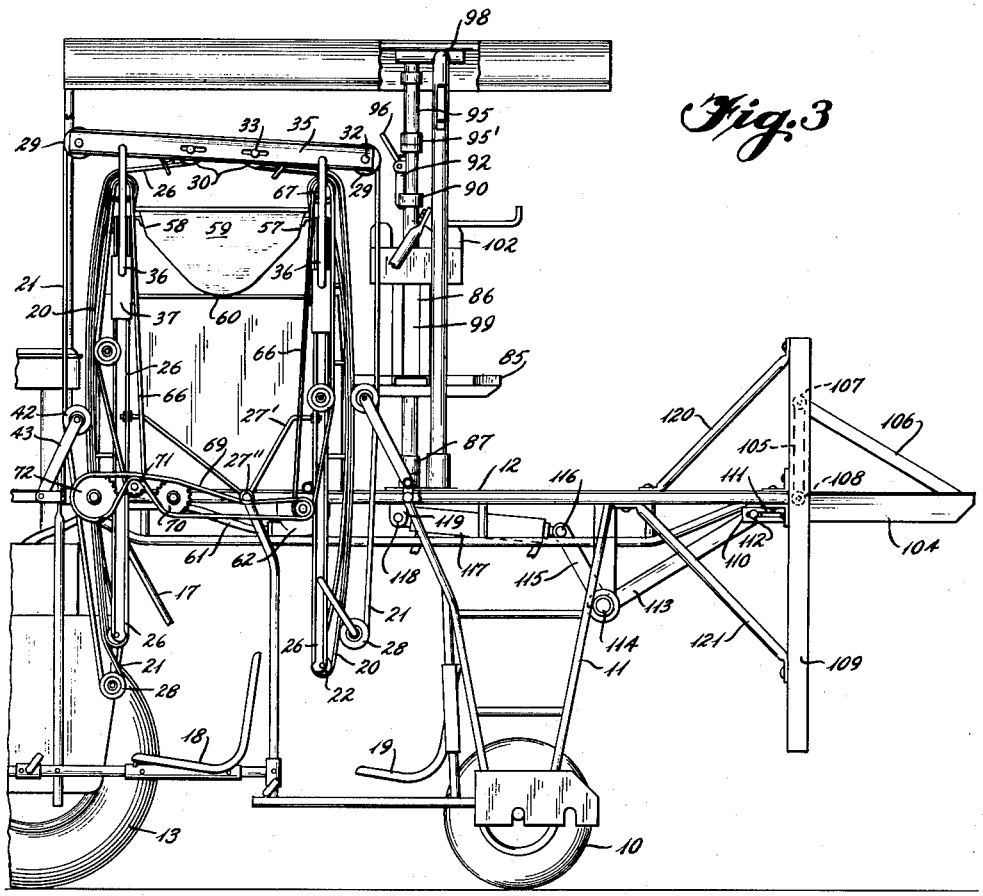
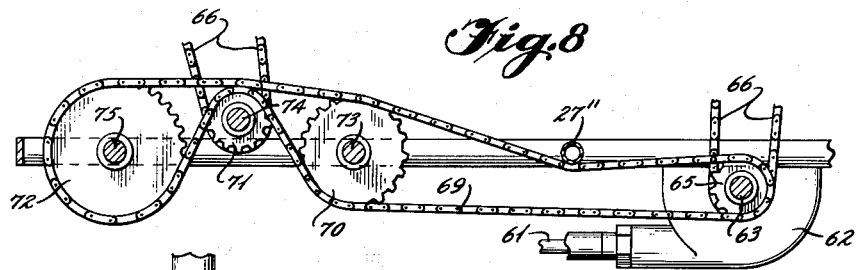
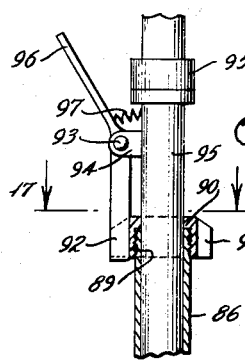
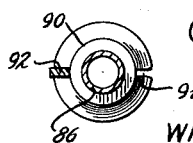
INVENTORS
WILLIAM R. LONG and
PHILIP J.T. RAWLINS
BY
ATTORNEY Nov. 2, 1965 W. R. LONG ETAL 3,215,288
TOBACCO HARVESTER WITH COACTING CONVEYORS AND TOBACCO
RECEIVING MEANS HAVING AN OPEN SIDE
Filed Nov. 6, 1961 6 Sheets-Sheet 4

INVENTORS
WILLIAM R. LONG
PHILIP J. T. RAWLINS

BY
ATTORNEY

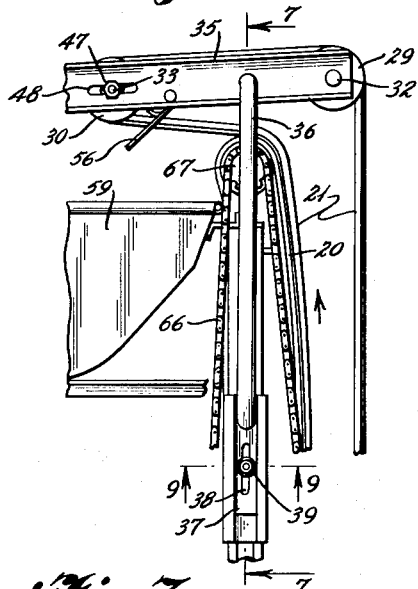
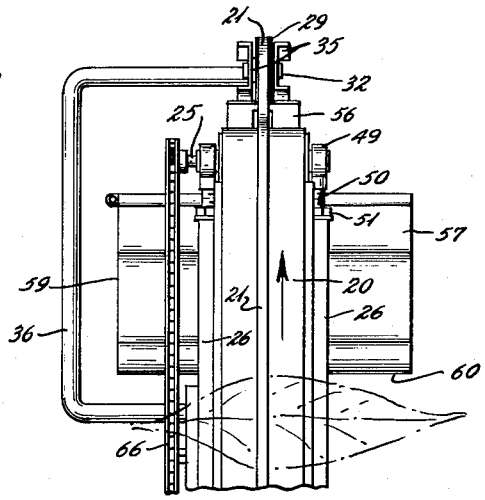
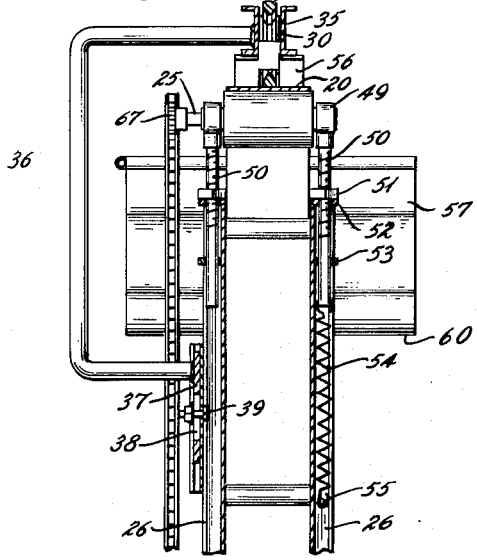
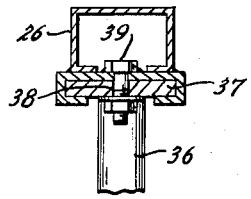
INVENTORS
WILLIAM R. LONG and
PHILIP J.T. RAWLINS
BY
ATTORNEY

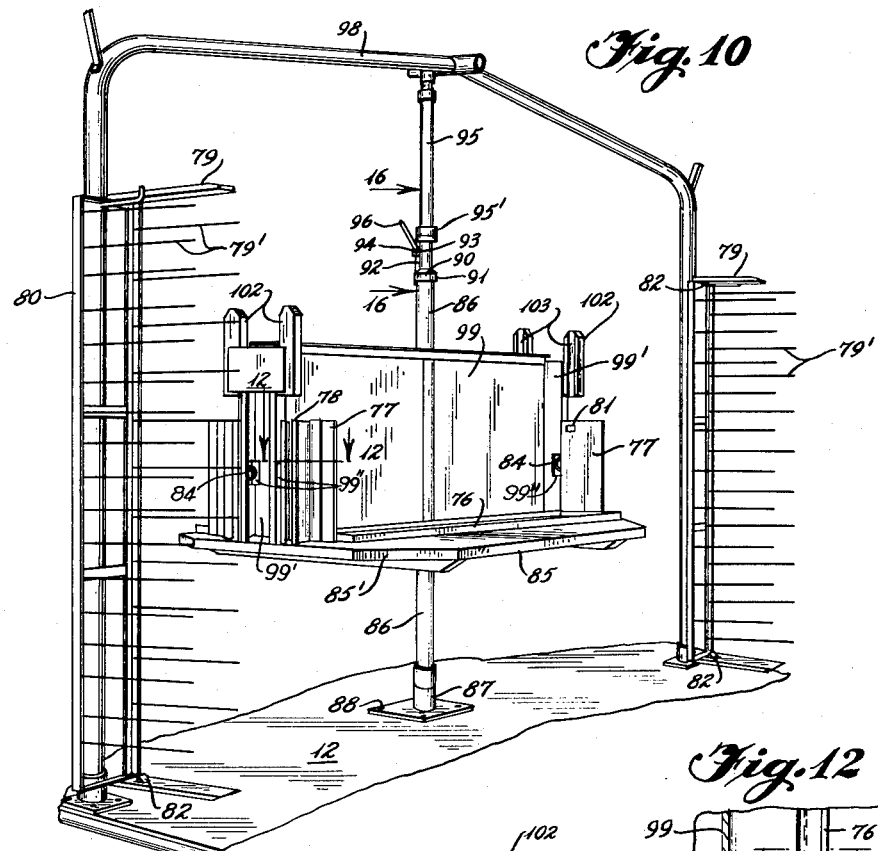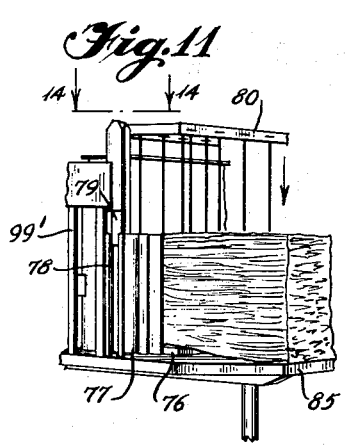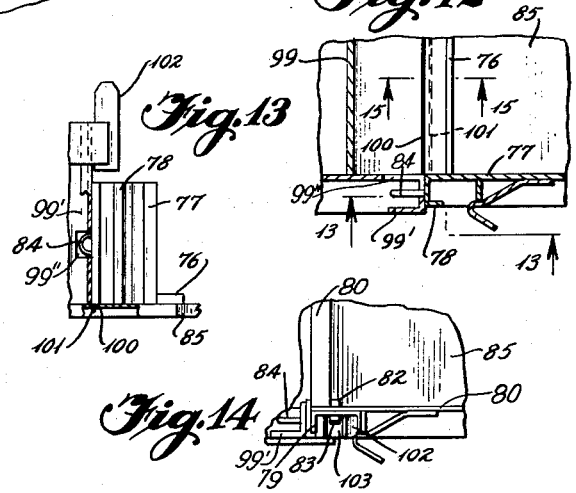

United States Patent Office 3,215,288
Patented Nov. 2, 1965

3,215,288
TOBACCO HARVESTER WITH COACTING CONVEYORS AND TOBACCO RECEIVING MEANS HAVING AN OPEN SIDE
William R. Long and Philip J. T. Rawlins, Tarboro, N.C., assignors to Long Manufacturing Company, Tarboro, N.C.
Filed Nov. 6, 1961, Ser. No. 150,424
9 Claims. (Cl. 214—5.5)

This invention relates to the harvesting, holding or containing, handling, transporting and curing of tobacco, and to apparatus and equipment employed for accomplishing the several operations, with unskilled labor, with a minimum of effort, in a minimum of time and with a maximum efficiency.

The invention relates particularly to harvesting equipment, and the several operations involved including the detachment of the leaves from the stalk, the transfer of the leaves to and the depositing of the same with the stems in the same general direction in a hopper adjacent a work station where they can be easily loaded in a carrier or holder for handling, transportation, and depositing of the leaves in the barn for curing.

Various methods have been employed in the harvesting and curing of tobacco including the use of trucks loaded by workmen, self-propelled vehicles on which workmen have been transported and who detached the leaves of tobacco from the stalks, placed them on a conveyor in which they were carried to a different, ordinarily higher, location where they were removed by another workman and placed on a stick or other means for transportation and handling. Devices of this character have been useful but too complicated, expensive and inefficient and they have been directed primarily to the individual curing of the leaves of tobacco and consequently have failed to meet the needs of the times.

It is an object of the invention to provide a self-propelled tobacco or other product harvester constructed and equipped to transport workmen, to convey the leaves of tobacco harvested from the workmen with the stems in the same direction away from the center of the harvester upwardly above an elevated platform, and to deposit it in hoppers at opposite sides of a central station, such hoppers being rounded or converging at the bottom and having their near sides open permitting a workman at such central station to gather in his hands a quantity of leaves of tobacco from the hoppers one at a time and place them on a carrier or holder.

Another object of the invention is to provide a carrier or holder having a base with upright extremities and across which base leaves of tobacco may be placed with the stems in the same direction and in generally parallel relation and a substantial mass of the same clamped against the base by a top or overlying portion for retaining the leaves in the holder.

Another object of the invention is to provide an elevated support or table on which a base of a holder can be held during filling, such support preferably being rotatable and with an upright wall and with means for location of the holder in a definite position relative to such wall, the locating means and wall facilitating the loading of the holder with the stems generally parallel and in the same direction and with the turntable being adapted to receive an empty holder in a remote position and then brought into a position to be filled and a filled holder to be removed and placed on a predetermined part of the vehicle.

Another object of the invention is to provide a harvester carrying workmen at a lower elevation with a work area at a higher elevation and with means for controlling the speed of the vehicle conveniently accessible to both as well as a conveyor system of a construction to facilitate reception and discharge of the harvested product.

Another object of the invention is to provide a self-propelled tobacco harvester having means for the workmen to ride thereon with conveyors for carrying the tobacco from a position convenient to such workmen to a station where the tobacco will be received in a manner readily to be placed in bulk on a carrier or holder, and the provision of a carrier or holder having a base and a top with means for fastening the same together to retain the tobacco therein as well as the provision of mechanism for filling and moving the carrier or holder.

A further object is to provide a tobacco harvester of a construction to receive and locate thereon a holder or carrier in a manner to facilitate the application of a substantial bulk or quantity of tobacco in the holder or carrier as well as the provision of a holder having a base with stanchions, one at each end, between which tobacco can be placed and with a top which will fit over the area between the stanchions and fasten the tobacco in place in the holder so that such tobacco readily can be handled, transported and placed in a barn and cured in such holder.

A still further object of the invention is to provide a self-propelled tobacco harvester having an elevated platform sufficiently high not to injure growing tobacco and which is used with a work station on such platform, a turntable adjacent such work station for receiving a special type of holder or carrier in lieu of the conventional tobacco stick with a simple conveyor mechanism for transferring the leaves of tobacco from workmen who detach them to a location convenient to said work space and turntable.

Figure 15:
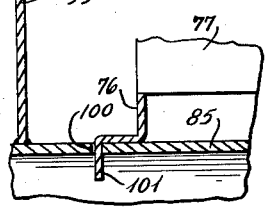

Other objects and advantages of the invention will be apparent from the following description taken in conjunction with the accompanying drawings, wherein:

FIG. 1 is a perspective of a harvester illustrating one application of the invention and taken from the left front and looking toward the right rear of the vehicle;

FIG. 2, a top plan view on the line 2—2 of FIG. 1;

FIG. 3, a fragmentary side elevation;

FIG. 4, a vertical section on the line 4—4 of FIG. 2;

FIG. 5, a fragmentary side elevation of an upper portion of the conveyor mechanism;

FIG. 6, a fragmentary front elevation of the conveyor;

FIG. 7, a vertical section on the line 7—7 of FIG. 5;

FIG. 8, a detail of the drive of the conveyor from the power plant and on the line 8—8 of FIG. 2;

FIG. 9, a horizontal section of the adjustment on line 9—9 of FIG. 5;

FIG. 10, a fragmentary perspective of the turntable and baling carrier or holder with guides for facilitating the application of a top to the base of the holder;

FIG. 11, a fragmentary perspective of one end of the carrier or holder with the parts assembled and containing tobacco therein;

FIG. 12, a horizontal section through the rack or holder on the line 12—12 of FIG. 10;

FIG. 13, a fragmentary detail on the line 13—13 of FIG. 12;

FIG. 14, a fragmentary elevation on the line 14—14 of FIG. 11;

FIG. 15, an enlarged fragmentary detail section on the line 15—15 of FIG. 12;

FIG. 16, a fragmentary detail of the turntable latching and releasing means viewed on the line 16—16 of FIG. 10; and FIG. 17, a transverse section on the line 17—17 of FIG. 16.

Briefly stated, the invention is a tobacco harvester having ground-engaging wheels, a frame with an elevated platform, a power plant for propelling the machine and for supplying power for driving the various parts of the machine. On the frame at each side of the machine are adjustably mounted for horizontal and vertical adjustment seats for workmen and conveniently near and forwardly of each of the seats for workmen is a conveyor system so that the workmen can detach the tobacco leaves, place them between conveyor belts and have them carried upwardly and deposited into a hopper, the rear workman on one side having his tobacco carried upwardly and deposited forwardly in the hopper and the forward workman on the same side having his tobacco carried upwardly and deposited rearwardly in the same hopper, the hoppers being closed at their remote or outer sides and open at their near or facing sides and being rounded or inclined at the bottoms to chute or slide the leaves by gravity to centered locations to facilitate the grasping and the removal of a quantity of leaves laterally thereof by the workmen and the placing of the leaves in a baling carrier or holder supported on a turntable adjacent the work area located centrally between the hoppers at opposite sides of the machine, the conveyor means being employed including an endless wide belt around pulleys at its upper and lower limits of travel and a narrow belt, preferably of the V-type, with its back against the surface of the wide belt and with the lower pulleys near the location pulley of the wide belt and with a pulley disposed over the hopper to provide an overhanging belt portion to cause tobacco placed between the cooperating belts to be carried upwardly and drop by gravity into the adjacent hopper.

With continued reference to the drawings, the harvester of the present invention includes rear ground engaging wheels 10 on which is mounted a frame 11 with an elevated platform 12 at an elevation sufficient to pass over the growing tobacco without damaging the tobacco. The harvester has a front driving wheel 13 driven by a variable speed power plant 14 and having a steering wheel 15. Means on the frame adjacent platform 12 is provided for controlling the operation of the power plant and the speed of the vehicle and includes a lever 16 above the platform and a lever 17 below the platform (FIG. 4) so that the workman on the adjacent lower seat may vary the speed of the vehicle in accordance with the speed of detachment of the leaves of tobacco. Forward and rear seats 18 and 19 are adjustably mounted on the lower frame of the vehicle for both elevational and axial movement. The workmen on these seats detach the ripe or prime leaves of tobacco from the stalks and in order to handle and transfer these leaves a conveyor system is provided having a portion supported in a convenient position to receive the leaves from each workman. Each conveyor system includes a pair of surface contacting or frictionally engaging belts 20, 21 located back to back, the conveyor belt 20 being the drive belt is flat and relatively wide and the conveyor belt 21 being a V-belt and having its wider flat back portion in contact with the surface of the conveyor belt 20 so that tobacco placed between the belts will be gripped and caused to travel with the portions of the belts between which it is located. The wide belt 20 is of the endless type and extends around lower and upper pulleys 22, 23 mounted on shafts 24, 25 carried by channel frame supports 26 attached to the frame of the machine by U-bolts about fixed shafts 27, with stabilizer rods 27' attached to a cross shaft 27". The belt 21 is mounted on pulleys 28, 29, 30 located on shafts 31, 32, 33, the shaft 31 being carried by a bracket 34 while the shafts 32 and 33 are carried between opposed bars 35 supported by a bracket 36 adjustably connected to the frame of the machine, the bottom of the bracket 36 is attached to a slotted slide plate 37 (FIG. 5) the slot 38 of which receives a bolt 39 attached to the frame of the machine so that the bracket 36 mounting the side bars 35 may be adjusted for raising and lowering the side bars 35 and the pulleys 29 and 30 for varying the tension on the V-belt 21.

In order to provide sufficient pressure between the belts 20 and 21 a backing plate 40 is provided such plate being of a width to fully support the entire width of the belt 20 such backing plate being carried by a series of brackets 41. Means is provided for applying additional pressure against the V-belt for moving it towards the relatively wide belt 20, such means being the form of an idler 42 carried on an arm 43 mounted by means of a pivot 44 on a bracket 45 clamped to the frame of the machine, pressure being provided by the weight of the angular bracket and the idler but if desired a spring 46 may be added. Additional adjustment of the V-bar may be provided by mounting the pulley 30 on a bolt or shaft 47 in slot 48 in the side bars 35. The pulley 23 mounted on the shaft 25 likewise is adjustable, the ends of such shaft being carried in the eyes 49 by threaded eye bolts 50 (FIG. 7) with an adjusting nut 51 which bears against a bracket 52 through which a second bracket 53 the eye bolt 50 extends and to the lower end of which is connected a spring 54 attached by a pin 55 to the channel frame member 26. The conveyor unit described is disposed in front of the rear workman seat at each side of the machine and is designed to receive the leaves of tobacco between the belts 20 and 21 with sufficient pressure to carry the tobacco upwardly without pressure sufficient to injure the tobacco. The tobacco will travel up and over the pulley 23 and may be allowed to fall by gravity but if any of the tobacco should stick to the back of the V-belt 21 it will be separated therefrom by a spring finger 56 attached to the side bars 35. In order to catch and collect tobacco discharged from between the belts 20, 21 composite chute and hopper structure is provided having supporting forward and rear walls 57 and 58, an outer side wall 59, and oppositely inclined or a rounded lower or bottom portion 60 and open toward the center of the harvester for ready access by workmen on the platform 12. Tobacco is placed in the conveyors with the stems extending outwardly from the side of the machine so that when the leaves of tobacco fall into the composite chute and hopper structure the stems will be adjacent the outer side wall 59 with the leaf tips towards the open side of the hopper but due to the oppositely inclined or rounded lower portion 60 the leaves will slide by gravitation to the lower mid-point thereof where they may be readily manually grasped and removed laterally from the composite chute and hopper structure.

There is a hopper at each side of the machine and the conveyor unit in front of the rear of the two seats at each side of the machine is provided for carrying tobacco into each of the hoppers from the rear. Similar conveyor units are provided at each side of the vehicle in front of the forward seats with such conveyor units constructed to discharge tobacco rearwardly into the front of the hopper where it will move downwardly and collect with the tobacco discharged forwardly into the rear of the hopper.

Power is supplied from the power plant 14 in any desired manner as for example through a driving cable 61 to a gear 62 on a transverse shaft 63. On the shaft 63 are mounted sprockets 64 and 65 (FIGS. 2, 4 and 8) the sprocket 64 driving a chain 66 which extends above a sprocket 67 on a shaft 25 to drive the pulley 23 and the flat back of the V-belt 21 being in contact with the center of the wide belt 20 will be driven by the latter. The drive thus far described is for the rear conveyor unit adjacent the rear seats for workmen one at each side of the harvester. The drive for the conveyor units adjacent the forward seats for workmen (FIGS. 1, 2 and 8) likewise is from the sprocket 65 on the shaft 63 which drives a chain 69 which in turn drives sprockets 70, 71 and 72 mounted on shafts 73, 74 and 75 attached to the frame of the machine the sprockets 70 and 72 being merely idlers, the sprocket 71 driving the shaft 74 on which a sprocket 68 (FIG. 1) driving the chain 66 which drives the shaft 25 and the conveyor unit. As shown in FIG. 8 the upper reach of the chain 69 is maintained under tension by cross shaft 27".

Between the hoppers is a work area for occupancy by a workman who removes the tobacco from the hoppers and with a quarter turn of his body is able to deposit the tobacco which he has grasped in his hands on the base 76 of a bulk tobacco holder having upright ends or stanchions 77 between which the leaves of tobacco are adapted to be placed with the stems abutting an upright wall of a turntable supporting the holder to be described later. The tobacco is placed upon the base until it is compressed by its own weight and is piled a substantial distance above the upright ends or stancheons 77 which may be of a height of 16 inches or other preferred dimension. On the remote outer sides of the upright ends or stanchions are guideway channel forming members 78 for receiving the tongues or guides 79 of a retention top or cap 80 adapted to be forced down onto the tobacco to compress it against the base 76. Both the base 76 and the top or cap 80 may be of generally rectangular or other desired construction with prongs or tines 79' carried by the top or cap 80 which are adapted to penetrate the leaves of tobacco and overlap the base 76 when the top is applied for securing tobacco in an amount approximately equal to the weight of an average man. The holder is provided with latching means including opening 81 in the guideway 78 for the receipt of a spring latch 82 secured by fasteners to the guide member 79, the spring latch having a manipulating end or portion 83 by which it may be released for removing the top 80 from the base 76. The cooperating guideways and guides on the ends of the bottom and top of the holder are nearer one side of the holder, substantially midway the length of and located nearer one edge of the holder than the other and on such near edge is a lifting eye or handle 84. When the holder is in position to be filled, it is placed near and parallel to an upright wall so that the leaves can be placed across the base of the holder with the stems next to the wall. Then after filling the top or retainer is applied to the holder, it may be turned on its side with the stems of the contained leaves uppermost and the tips downwardly and the holder lifted by the handles 84.

In order to support the base holder at a convenient height for filling, a turntable is provided including a flat surface member or platform 85 (FIG. 10) mounted on an upright shaft 86 held vertically in position by an upper fixed shaft 95 and resting in a thrust bearing 87 secured by fasteners 88 to the platform 12. As seen in FIG. 16, the upper end of the shaft 86 has a threaded end 89 on which is received a nut 90 having opposed radial slots 91 in which is received a latch 92 mounted on a pivot 93 carried by spaced lugs 94 attached to the member fixed supporting shaft member 95. The latch 92 has an operating handle 96 with a spring 97 normally maintaining the latch in the slot but by moving the handle 96 towards the upright 86, the latch can be released to allow the platform to be rotated 180 degrees about the upright 86 whereupon it will enter the opposite notch 91. The upright 86 at its upper end is rotatably supported on fixed shaft 95 by means of a bearing member 95', the opposed end of the fixed shaft 95 being connected to the roof frame 98 for supporting a protective covering for the harvester. The turntable 85 is of generally rectangular construction with its corners 85' beveled to allow the turntable to operate in a slightly smaller circle and to permit workmen to move around such portions with greater facility.

The turntable is provided with an upright wall 99 extending centrally from end to end of the same and parallel to such wall at each side of the same there is a channel or slot 100 in which a depending flange 101 of the base 76 of the holder is adapted to be received. Accordingly when the flange 101 of the holder is placed in the channel 100, the holder will be spaced the proper distance from the upright wall 99 and the stems of tobacco will be abutted against said wall 99 supported at its ends by channel members 99', said channel members 99' having cut out portions 99" to receive lifting eyes 84. The base of the holder is filled with tobacco above the end uprights or stanchions. Thereafter the compressing and retaining top portion of the holder can be applied for securing a substantial bulk of tobacco in the holder.

In order to facilitate the application of the top or retaining cover member 80 for the holder, a guide 102 mounted at each end of wall 99 on channel member 99' and having a guideway 103 is provided for each of the guide members 79. Consequently the application of the cap is relatively simple, it being only necessary to place the guides 79 on the cover in the guideways 103 and to press the retaining cover downwardly.

When the base of a holder is being filled a second workman can place an empty base of a holder in the proper position, at one side of wall 99, on the turntable and after the holder on the opposite side of the turntable is filled by a workman the turntable can be rotated 180 degrees and the top applied to the filled holder by the workman who supplies the empty holders and then removes the filled holder and stacks the same on the rear of the platform 12 of the harvester.

In view of the fact that the filled holders are of substantial weight, on the order of that of a man, a hydraulic lift 104 may be provided at the rear end of the platform 12, such lift including uprights 105 and braces 106. The uprights 105 have rollers 107 and 108 which reciprocate in upright channels 109 at each side of the platform. Attached to the lift 104 are a pair of brackets 110, one of said brackets being adjacent one of the channel members 109 and each bracket member having a lengthwise or horizontal slot 111 in which a pin 112 rides, such pin being on a crank arm 113 mounted on a pivot 114, the cooperating crank arm 115 being attached to the piston 116 of a hydraulic cylinder 117 the remote end of which is secured by a pivot 118 and a bracket 119 to the frame of the lift. In order to brace the channel members 109 a pair of brackets 120 and 121 may be fixed to such channel members and to the frame of the lift.

It will be apparent from the foregoing that a tobacco harvester is provided with a pair of spaced seats for workmen at each side of the same, a conveyor unit is provided adjacent each of the four seats for the workmen at one side of the machine carrying the tobacco upwardly and over a hopper so that the tobacco will fall thereinto, that the harvester is self-propelled and the speed can be controlled by the workmen in accordance with the rate of the harvester, that an elevated platform is provided with a work area beween the hoppers, a turntable is provided convenient to the work area, such turntable being adapted to support the base of a bulk tobacco leaf holder having end stanchions to permit the workmen to move the tobacco from the hopper and place the tobacco on the holder between the stanchions, the turntable having locating means for the holder and having an upright wall against which the leaves of tobacco can be abutted in the filling of the holder.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A tobacco harvester machine comprising a frame, stations for workmen at a low elevation on said frame to facilitate the detachment of the leaves of tobacco from growing plants, a pair of tobacco leaf conveyor systems wherein one system is mounted at each side of the machine, each of said conveyor systems comprising a pair of aligned conveyor units longitudinally spaced on the machine, each of said conveyor units of each pair being positioned adjacent one of said workmen stations and of a construction to discharge tobacco leaves toward the other unit and above an elevated work area, said work area comprising a platform, means mounted above said work area on said machine and extending between each pair of spaced conveyor units to receive the discharged leaves from each of said conveyor units, said receiver means comprising a composite chute and hopper structure to convey by gravity the tobacco leaves from both of said conveyor units to an intermediate location thereon whereby the leaves become arranged and bunched together at said intermediate location to provide for their ready and convenient removal therefrom by a workman on said platform.

2. A tobacco harvester having a power source and comprising a frame having a longitudinal axis, ground-engaging wheels supporting said frame, tobacco leaf defoliating stations for workmen on each side of said frame positioned at an elevation below the tops of said wheels to facilitate the detachment of leaves from growing tobacco plants, platform means on said frame at an elevation above said workmen's stations to provide a work area thereabove, means on said frame accessible above and below said platform for controlling said power source, a pair of generally vertically extending conveyor systems for receiving the tobacco leaves adjacent the workmen's stations, each of said conveyor systems comprising a pair of aligned and longitudinally spaced conveyor units positioned adjacent each side of said frame, each of said conveyor units including a pair of coacting belt members having surfaces thereof in contact with each other to convey and discharge the tobacco leaves at an elevation above said platform, a composite chute and hopper structure mounted on said platform means at each side of said work area and extending longitudinally of said frame, each of said composite chute and hopper structures having end portions underlying the upper discharge ends of said pair of longitudinally spaced conveyors for receiving the tobacco leaves therefrom, said hopper structures being open at their inner sides facing the work area and having oppositely inclined lower portions to effect sliding movement of the tobacco leaves by the action of gravity downwardly and longitudinally of the frame to an intermediate station adjacent said work area to permit the grasping and removal of the same by a workman at said intermediate station.

3. The combination in a tobacco harvester of a vehicle having a frame, means whereby said vehicle can be propelled including a power plant, a pair of spaced supports for workmen carried by said frame at a height adapted for conveniently picking tobacco leaves from growing plants, platform means disposed above said spaced supports, a pair of substantially vertically extending conveyor units of the multi-belt type having mutually coacting and engaging surfaces for conveying tobacco leaves from adjacent said stations to an elevation above said platform means, said conveyor units being spaced apart longitudinally of said frame and in alignment with each other, said conveyor units having their upper end portions extending toward each other whereby leaves of tobacco carried upwardly thereby will be discharged and caused to drop between them at longitudinally spaced locations, receiver means mounted on said platform under and between the upper ends of said spaced-apart conveyor units, said receiver means comprising a composite chute and hopper structure to gravitationally convey the leaves discharged from both of said conveyor units to an intermediate location therein whereby the leaves become bunched together at said intermediate location, said combined chute and hopper structure being of a construction to provide direct lateral removal of the bunched-together leaves therefrom at said intermediate location.

4. The structure of claim 1 and a turnable having a horizontal planar support surface thereon adjacent the upper portions of said conveyor systems and mounted on said platform adjacent said work area and adapted to directly support a bulk holder of tobacco on said support surface, and means mounted above said turntable for releasably securing said turntable against rotation until a tobacco holder positioned thereon in close proximity to and between said conveyor systems is filled, means whereby said turntable securing means can be actuated to permit the turntable to be rotated to allow the removal of the filled tobacco holder and the supplying of an empty holder in place of the filled tobacco holder.

5. A harvester comprising a variable speed power-driven vehicle including a frame having an elevated platform thereon, structure on said frame providing a product harvesting station for a workman at an elevation below said platform, a harvested product conveyor system mounted on said frame having a portion thereof disposed adjacent to said station for a workman, said conveyor system being of a construction to discharge the harvested product therefrom at a location above said platform, a composite chute and hopper structure mounted in a position to receive the product discharged, said composite chute and hopper structure including an inclined section for causing the product to gravitationally slide thereon to a lower portion of the composite chute and hopper structure constructed and arranged to facilitate the grasping of the product by a workman for lateral removal therefrom, said platform on said frame providing a work area adjacent said composite chute and hopper structure, and means for controlling the speed of the vehicle, said means being mounted on the harvester in a location whereby it is accessible to both the workman's station below said platform and to the work area on said platform.

6. A harvester comprising a frame, a station for a workman at a relatively low elevation on said frame to facilitate harvesting a product, a conveyor system mounted on said frame adjacent the workman's station, said conveyor system being of a construction to discharge the harvested product at an elevation above said station, composite fixed chute and hopper means mounted in position to receive the product discharged, said composite chute and hopper means having an inclined lower portion for causing the product to move thereon by gravity to a location intermediate the length thereof to facilitate the grasping of the product by a workman for direct lateral removal therefrom at said intermediate location, said conveyor system including a pair of coacting conveyor belt members each having surfaces in contact with the other for carrying the harvested product from a position adjacent the workman's station to an elevation above the workman's station, one of said conveyor belt members being of a width to engage only a narrow lengthwise strip of the other conveyor belt member, a backing member for the said one conveyor belt member, and means for pressing the conveyor belt members toward each other, one of said conveyor belt members at its upper end extending beyond and across the other to transmit the conveyed harvested product to a position to fall by gravity into said composite chute and hopper means.

7. A harvester comprising a frame, a station for a workman at a relatively low elevation on said frame to facilitate harvesting a product, a conveyor system mounted on said frame adjacent the workman's station, said conveyor system being of a construction to discharge the harvested product at an elevation above said station, composite fixed chute and hopper means mounted in position to receive the product discharged, said composite chute and hopper means having an inclined lower portion for causing the product to move thereon by gravity to a location intermediate the length thereof to facilitate the grasping of the product by a workman for direct lateral removal therefrom at said intermediate location, said conveyor system including a pair of coacting conveyor belt members each having surfaces in contact with the other for carrying the harvested product from a position adjacent the workman's station to an elevation above said station, one of said conveyor belt members being of a width to engage only a narrow lengthwise strip of the other conveyor belt member, a backing member for the wider conveyor belt member, and means for yieldably pressing the narrow conveyor belt member against the last-mentioned conveyor belt member, one said conveyor belt member at its lower end extending below the other of said belt members and farther away from said workman's station than the other of said belt members to facilitate introduction of the harvested product between said contacting surfaces of said conveyor belt members.

8. In a tobacco harvester having an elevated platform extending longitudinally thereof and providing a work area, longitudinally spaced and aligned conveyor means for elevating tobacco leaves from below said platform to opposite sides of said work area, a composite fixed chute and hopper means on said platform for receiving the tobacco leaves from said spaced and aligned conveyor means, a turntable including a table top surface thereon mounted on said platform for movement about a vertical axis for supporting bulk tobacco holder means thereon adjacent to said work area and in fixed angular position relative to said composite chute and hopper means for receiving the tobacco leaves therefrom, means mounted above said turntable for controlling the rotary position thereof for filling a holder with tobacco leaves, the removal of a filled holder therefrom and for receiving an unfilled holder thereon in place of a filled holder, means on said turntable mounting an upright abutment wall centrally thereon and extending transversely and from side to side thereof against which the stems of tobacco leaves are adapted to be abutted for alignment of the leaves in a holder, said turntable top surface having means formed therein and extending transversely thereof and substantially parallel to said upright abutment wall adapted for predeterminately positioning a tobacco holder relative to said upright abutment wall, and means carried by said upright wall mounting means being adapted for positioning holder closure means relative to at least a filled holder.

9. A tobacco harvester as defined in claim 7 including a turntable having a planar top supporting surface mounted on said platform between and adjacent each of said hopper structures, said turntable having a vertical wall mounted on and extending medially across said turntable top planar surface against which the stems of tobacco leaves are adapted to be abutted for alignment purposes when placed in bulk tobacco holders thereon, said turntable top surface including means therein adapted to coact with a bulk tobacco holder positioned directly on said top surface and alongside of said vertical wall thereon for positioning the holder in a definite fixed position relative to said wall, and means positioned above said turntable top surface for releasably holding said turntable in either of two oppositely opposed rotary positions for the filling and removal of bulk tobacco holders therefrom.

References Cited by the Examiner
UNITED STATES PATENTS

| | | | |
|---|---|---|---|
| 908,609 | 1/09 | Radcliff | 198—79 X |
| 1,934,059 | 11/33 | Griffith et al. | 198—65 |
| 2,529,023 | 11/50 | Helms | 209—124 X |
| 2,675,136 | 4/54 | Spikes | 214—83.1 |
| 2,702,134 | 2/55 | Alphin | 214—83.1 |
| 2,732,961 | 1/56 | Ervin | 214—5.5 X |
| 2,788,141 | 4/57 | Hendrix | 214—83.1 |
| 2,927,705 | 3/60 | Girardi | 214—83.1 |
| 2,930,494 | 3/60 | Frushour et al. | 214—5.5 |
| 2,933,206 | 4/60 | Alphin | 214—5.5 |
| 2,940,615 | 6/60 | Long et al. | 214—5.5 |
| 2,952,370 | 9/60 | Long | 214—5.5 |
| 3,034,664 | 5/62 | Davis | 214—5.5 |
| 3,083,517 | 4/63 | Wilson | 56—27.5 |
| 3,107,018 | 10/63 | Mish | 214—83.1 |

HUGO O. SCHULZ, *Primary Examiner.*

ERNEST A. FALLER, JR., MORRIS TEMIN,
*Examiners.*